W. E. KELLY.
BORING BAR.
APPLICATION FILED JAN. 10, 1918.
1,362,871.
Patented Dec. 21, 1920.
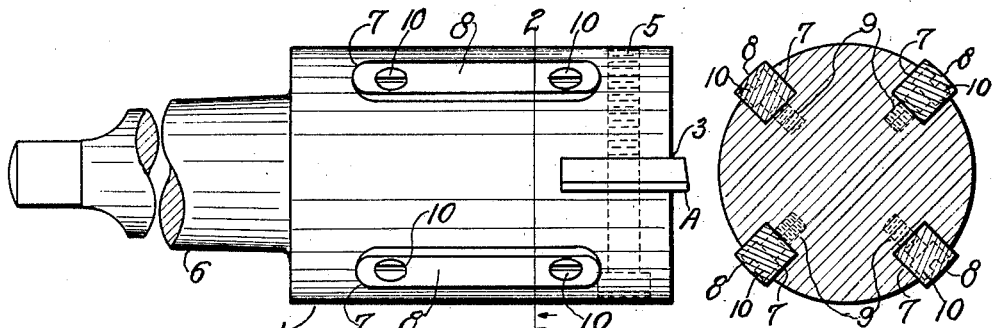
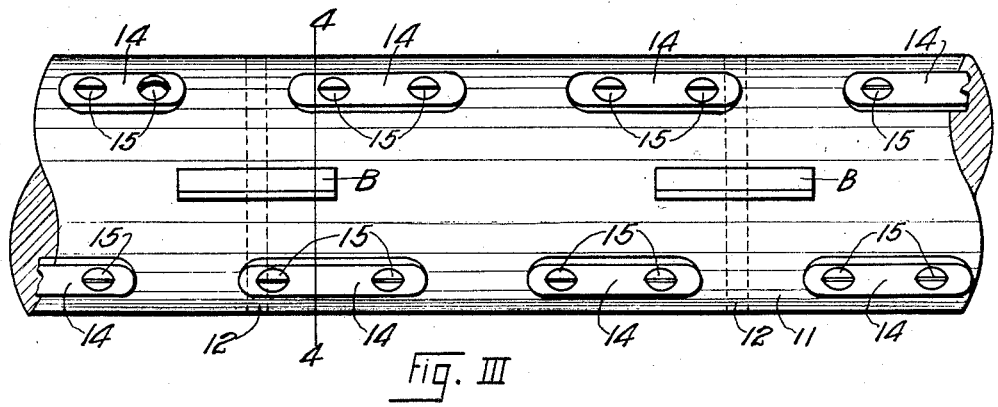
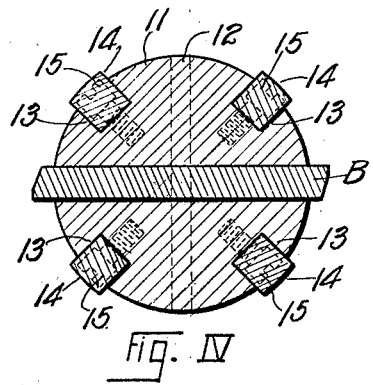
Inventor.
William E. Kelly.

UNITED STATES PATENT OFFICE.

WILLIAM E. KELLY, OF CLEVELAND, OHIO.

BORING-BAR.

1,362,871. Specification of Letters Patent. Patented Dec. 21, 1920.

Application filed January 10, 1918. Serial No. 211,169.

*To all whom it may concern:*

Be it known that I, WILLIAM E. KELLY, a citizen of the United States, residing at Cleveland, in the county of Cuyahoga and State of Ohio, have invented a new and useful Improvement in Boring-Bars, of which the following is a specification.

My invention relates to boring bars which have one or more hardened surfaces and which are adapted to run in bushings.

The object of my invention is to provide an efficient and economical method and mechanism of producing the aforesaid hardened surfaces on a boring bar.

In the present day system of manufacture it is essential that duplicate parts be manufactured accurately and quickly. This can only be accomplished by jigs and special fixtures and boring bars which are guided in these jigs. These boring bars must fit snugly into the jigs to produce accurate work and must be hardened to prevent wear thereon so that such snug fit may endure.

The procedure heretofore has been to machine these boring bars out of solid stock to dimensions a little larger than required for the jig; then harden the same and finally grind the same to fit the jig correctly. Attempts have been made to insert strips into a bar, by dove-tailing and the like, but such procedure is not satisfactory since these strips wear rather rapidly on the outside and it is an expensive proposition to replace them owing to the machining and fitting of the beveled surfaces. Furthermore it is necessary that these dove-tailed strips be inserted endwise which is not practical and tends to weaken the boring bar since these dove-tailed slots must be cut substantially the entire length of the bar and be open at one end at least in order to insert the pilot strips. Furthermore, the dove-tailed slots are expensive to cut in the bar and are difficult to straighten in case the bar gets bent while it is being hardened or from other causes.

It will be seen that the pilot strips are inserted similar to a spline in a shaft, but since the pilot strips serve a different purpose than a spline, that portion thereof which projects outside of the bar or body must be machined and otherwise prepared differently than a spline as will appear hereinafter.

The disadvantages of the former procedure is that the boring bars crack and break or bend quite frequently while they are being hardened and that they could not be straightened if they were bent either during the process of hardening or while in use or by careless handling. It is well-known that boring bars for accurate work, and long boring bars particularly, are expensive and rather delicate and any disadvantages which may be corrected in their production and maintenance are of considerable advantage in the art. Furthermore, the old bars fill the guide bushings completely while the boring bar of the present invention provides chip clearance in the bushing.

To overcome the aforesaid disadvantages and produce a better boring bar than heretofore, the present invention proposes to construct the boring bar of comparatively soft steel and to insert therein, at suitable intervals or locations, hardened pilot strips which are ground to fit the bushing of a jig or whatever guide the bar may have to fit and which are capable of withstanding considerable wear. With such an arrangement the pilot strips can be hardened to a much higher degree than the boring bar itself could be, while the boring bar itself remains comparatively soft; the pilot strips will not wear as quickly, the danger of cracking or breaking the boring bar is eliminated, the pilot strips can be packed out, with paper or otherwise, when worn and re-ground to proper size, the pilot strips can be made as a commercial article and kept in stock ready to be inserted in a boring bar when the old ones are worn, the entire boring bar need not be replaced when the pilot is worn, and the boring bar can be straightened at any time in case it becomes bent by use, or careless handling, or other cause.

The aforesaid aims and objects are sufficiently illustrated in the accompanying drawings in which Figure I is a general side view of a short boring bar with a cutter in its end and with pilot strips; Fig. II is a section on line 2—2 (Fig. I); Fig. III is a portion of a long boring bar with pilot strips, and Fig. IV is a section on line 4—4 of Fig. III. Similar reference characters refer to similar parts throughout the several views.

Referring now particularly to Figs. I and II of the drawings:

The body 1, preferably made of rather soft but tough material, but not hardened, has the slot 3 for the purpose of receiving the cutter A which is held in position by the screw 5. On the other end, body 1 has the shank 6 whereby the bar may be driven. The main portion of the body 1 is made somewhat smaller than the cutter A, has the slots 7 into which the pilot strips 8 fit snugly and further has the tapped openings 9 which are adapted to receive the screws 10 which hold the pilot strips 8 in place.

It should be noted that all of the slots 7 are of the same width and depth and length and that the sides thereof are parallel. This is for the purpose of permitting the pilot strips 8 to be interchanged in the slots 7.

It is preferred that the front portion of these pilot strips 8 overlap the rear portion of the cutter A to the end that a portion of the pilot strips 8 be guided in the guide bushing at the same time when the cutter A first starts on its cut.

The pilot strips 8 should fit snugly into the slots 7, should project a sort distance outside of the body 1, and should be properly hardened and ground. It will be seen that the sides of the slots 7 are parallel; this is for the purpose of permitting the strips 8 to be inserted in or removed from the bar radially. The slots 8 are not longer than the strips 7 which fill the slots 8 completely and thereby strengthen the bar as a whole.

When the pilot strips become worn, they may be packed out or adjusted by placing paper or tin foil or other substance between the bottom of the slots 7 and the pilot strips 8.

Since the slots 7 are all of the same size, all of the pilot strips 8 also are of the same size and can, therefore, be manufactured in quantities and kept ready for instant use. With this arrangement, the cost of production of the boring bars as well as their upkeep is materially reduced since only one end set of gages and tools are needed for the production of the parts; the pilot strips can be manufactured in quantity, thereby reducing their cost, and can be kept on hand for instant use and can be inserted in a bar in a very short time, thereby saving considerable time and expense which would otherwise be consumed if a pilot strip had to be fitted, and can be interchanged from one slot to another without altering their form.

The distance which the pilot strips 8 project outside of the main portion of the body 1, determines the chip clearance and should be determined in each particular case and with reference to the work to be done by the tool. When this distance is properly determined, chips will not collect in the bushing and will not cause cutting and trouble and ruin of the bar and bushing which frequently happens in bars of the old construction.

Referring now particularly to Figs. III and IV:

The boring bar 11 shown here is preferably made of rather soft but tough steel, has the cutters B which are held in position by the pins 12, has slots 13 into which the pilot strips 14 fit snugly, and has tapped openings to receive the screws 15 which hold the pilot strips in place.

The pilot strips 14, prepared and inserted similar to the pilot strips 8, are staggered endwise so that the end of one pilot strip extends beyond the end of the next or adjoining pilot strip. The object, therefore is to have some portion of some of the pilot strips in the guide bushing at all times and eliminate "shoulders."

The operation and construction not described in detail in connection with Figs. III and IV are similar to those described in connection with Figs. I and II.

It will be seen that the present invention provides an efficient mechanism which is economical of first cost and of maintenance since all danger of breaking or bending of the bar during its construction is eliminated and since it can be straightened if it is bent, and since the pilot strips can economically be manufactured in quantity and in duplicate and can be kept on hand for instant use and can readily be replaced when worn, and since the clearance between the pilot strips prevents cutting of the guide bushing as well as the pilot strips and promotes lubrication thereof.

It is thought that the two applications of my invention shown and described are sufficient to fully set forth my invention, although other combinations of elements may be devised to accomplish the aim and embody the spirit of the present invention.

Therefore, without limiting myself to the precise construction shown and described,

I claim:

1. In a boring bar, the combination of a body provided with a plurality of slots all of which being of the same width and depth and length and overlapping each other longitudinally of said body and having parallel sides, a cutter mounted in said body, and a pilot strip in each of said slots and adapted to guide said cutter by the outer surfaces thereof.

2. In a boring bar, the combination of a body which is provided with slots all of which being of the same width and depth and length and having parallel sides, a cutter mounted in said body, and a pilot strip held against circumferential and longitudinal movement in each of said slots and adapted to guide the said boring bar while it is rotating.

3. In a boring bar, the combination of a body which is provided with parallel sided and duplicate slots, a cutter mounted in said body, and pilot strips formed in duplicate and mounted in said slots and adapted to guide said bar by the outer surfaces thereof.

4. In a boring bar, the combination of a body which is provided with duplicate slots which have parallel sides and closed ends, a cutter mounted in said body, and pilot strips in said slots and the outer surfaces thereof formed to guide said bar while the same is rotating.

5. In an apparatus of the character described, the combination of a body provided with parallel sided slots, and pilot strips in said slots and the outer surfaces thereof formed to guide said apparatus while the same is rotating.

WILLIAM E. KELLY.